United States Patent
Ross

(10) Patent No.: US 6,795,648 B1
(45) Date of Patent: Sep. 21, 2004

(54) HIGH RESOLUTION PHOTOGRAPHIC SYSTEM

(76) Inventor: Clifford Ross, 264 W. 11th St., New York, NY (US) 10014

( * ) Notice: Subject to any disclaimer, the term of this patent is extended or adjusted under 35 U.S.C. 154(b) by 43 days.

(21) Appl. No.: 10/437,664

(22) Filed: May 13, 2003

(51) Int. Cl.⁷ .................................................. G03B 13/24
(52) U.S. Cl. ...................... 396/150; 396/151; 396/341; 396/441
(58) Field of Search ................................ 396/150, 151, 396/341–344, 440, 441

(56) References Cited

U.S. PATENT DOCUMENTS

| | | | |
|---|---|---|---|
| 1,942,161 A | 1/1934 | Black | |
| 1,974,842 A | 9/1934 | Black | |
| 2,032,380 A | 3/1936 | Stevens | |
| 2,048,439 A | 7/1936 | Fairchild | |
| 2,055,089 A | 9/1936 | Roters | |
| 2,061,192 A | 11/1936 | Gaty | |
| 2,131,926 A | 10/1938 | Weiblen et al. | |
| 2,133,011 A | 10/1938 | Black | |
| 2,301,921 A | * 11/1942 | Wilcox | 396/342 |
| 2,310,850 A | * 2/1943 | Grover | 396/342 |
| 2,342,509 A | 2/1944 | Gaty et al. | |
| 2,342,510 A | 2/1944 | Fischer et al. | |
| 2,342,511 A | 2/1944 | Gaty | |
| 2,342,512 A | 2/1944 | Gaty | |
| 2,342,513 A | 2/1944 | Gaty | |
| 2,372,974 A | 4/1945 | Nash | |
| 2,380,034 A | 7/1945 | Doyle | |
| 2,399,476 A | 4/1946 | Doyle et al. | |
| 2,403,587 A | 7/1946 | Doyle et al. | |
| 2,415,563 A | 2/1947 | Nash | |
| 2,417,482 A | 3/1947 | Gacki | |
| 2,424,276 A | 7/1947 | Johnston et al. | |
| 2,424,439 A | 7/1947 | Doyle et al. | |
| 2,429,051 A | 10/1947 | Doyle | |
| 2,456,052 A | 12/1948 | Doyle et al. | |
| 2,456,053 A | 12/1948 | Doyle | |
| 2,456,392 A | 12/1948 | Doyle | |
| 2,474,323 A | 6/1949 | Rattray | |
| 2,482,596 A | 9/1949 | Rattray et al. | |
| 2,495,161 A | 1/1950 | Doyle et al. | |
| 2,512,486 A | 6/1950 | Craig et al. | |
| 2,514,991 A | 7/1950 | Doyle et al. | |
| 2,516,068 A | 7/1950 | Nash | |
| 2,517,781 A | 8/1950 | Gacki et al. | |
| 2,521,153 A | 9/1950 | Doyle | |
| 2,619,014 A | * 11/1952 | Geddes | 396/342 |
| 3,813,682 A | * 5/1974 | Nishikawa et al. | 396/441 |
| 3,825,938 A | * 7/1974 | Koch | 396/342 |
| 3,836,932 A | * 9/1974 | Lohl et al. | 396/441 |
| 4,602,860 A | * 7/1986 | Hoffman | 396/150 |
| 4,733,257 A | * 3/1988 | Ziegler | 396/342 |

OTHER PUBLICATIONS

Sinar Standards and Backs, Sinar Bron Corporation.
Vacuum and Pressure Standard Product Catalog, Rietschle Thomas, pp. 2–24, 2003.

* cited by examiner

Primary Examiner—David M. Gray
(74) Attorney, Agent, or Firm—Kenyon & Kenyon

(57) ABSTRACT

A high resolution photographic system has a lens, a camera body, a bellows connecting the lens to the camera body, a ground glass designed for use with a microscope for focusing on the aerial image, a magazine configured to store a roll of film, wherein the magazine provides a pneumatic suction of a 9"×18" frame of the film to a back of the magazine, two supports configured to connect to the camera body at a point coincident with the central horizontal axis of the negative allowing the camera body to tilt a user defined amount, a connection plate configured to connect each of the two supports, wherein the connection plate provides a swivel attachment for horizontal rotation of the camera body relative to the lens, a support rod attached to the connection plate, wherein the support has a bellows support and a front standard, a mirror alignment device, and a tripod which supports the rest of the photographic system.

21 Claims, 8 Drawing Sheets

HIGH RESOLUTION PHOTOGRAPHIC SYSTEM

FIELD OF THE INVENTION

The present invention relates to the field of photography. More particularly, the invention provides an extremely high resolution photographic system which may be positioned to a user defined configuration like a traditional view camera, but with a very fine accuracy. The invention employs a winding film transport for very large negatives.

BACKGROUND INFORMATION

Photographic systems provide a valuable method for capturing and storing images. Generally, photographic systems are designed to provide a picture quality sufficient so a person viewing the photograph may discern desired features of the image. Often times, however, more detail is needed. To obtain this detail, images are enlarged to produce a magnification of the features. Such enlargement, however, has significant drawbacks. Enlarged photographs from the negatives often reveal severe limitations. The significantly enlarged photograph has a grainy appearance and the resulting details are not clear. In regard to showing clear detail with significant enlargement, all previous photographic systems have shortcomings.

SUMMARY

It is an object of the present invention to provide a photographic system to produce a negative from which extremely sharp, high resolution large scale photographs may be made at a previously unequalled level.

It is also an object of the present invention to provide a high resolution photographic system which is portable for use in conventional portrait, still life, or landscape photography.

It is a still further object of the present invention to provide a high resolution photographic system which maintains film in a flat configuration during exposure, thereby limiting distortion of the exposed negative.

It is a still further object of the present invention to provide a high resolution photographic system which is configured to use rolls of color negative or black and white negative film which will result in a 9 inch×18 inch negative.

These and other objects of the present invention will be achieved as illustrated and described. A high resolution photographic system is provided. The system comprises a lens, a camera body with film advance mechanism, a bellows connecting the lens to the camera body, a magazine configured to store and transport a roll of film, wherein the magazine allows a pneumatic suction of a 9 inch×18 inch frame of the film to a platten at a back of the magazine, two supports configured to connect to the camera body at a central horizontal axis of the negative allowing the camera body to tilt a user defined amount, a connection plate configured to connect each of the two supports, wherein the connection plate provides a swivel attachment for horizontal rotation of the camera body relative to the lens around a center vertical axis of a film plane, a support rod attached to the connection plate, wherein the support has a bellows support and a front standard; a mirror alignment device to aid lens and film plane alignment, a custom ground glass with at least two aerial image circles, and a vacuum pump configured to provide the pneumatic suction.

DETAILED DESCRIPTION

Figure 1:
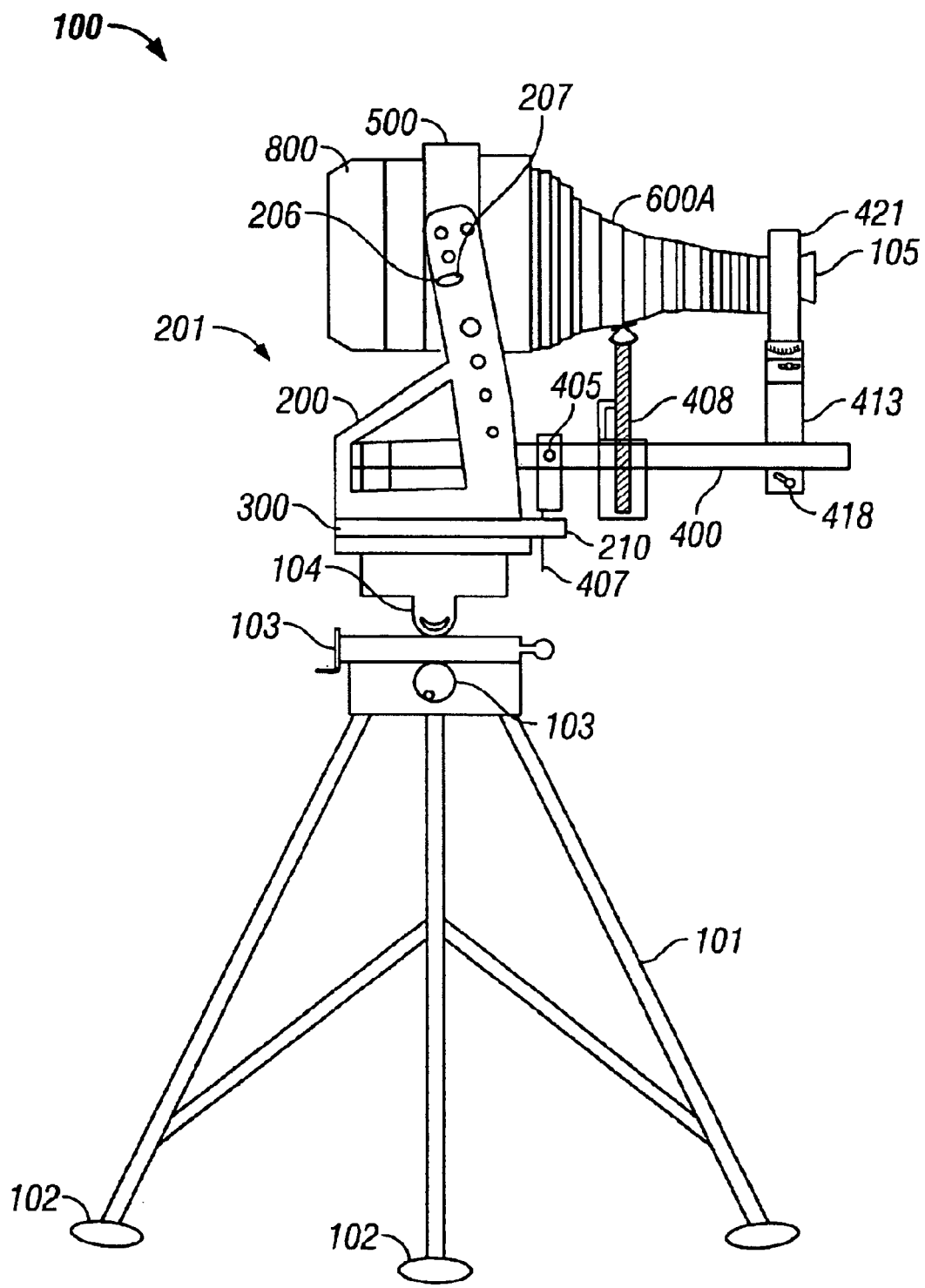
FIG. 1 is a side view of a high resolution photographic system in accordance with the present invention.

FIG. 1 illustrates a high resolution photographic system 100 which has a lens 105, two support arms 200 and 201, a magazine 800, and a connection plate 300 between the two supports 200 and 201 and a camera body 500. The photographic system 100 further has a lens and bellows support rod 400, a bellows 600A, a bellows support 408, a front standard 413, and a tripod 101. The lens 105 may be quickly released from the front standard 413 so that alternate lenses may be installed. The lens 105 may be, for example, an extremely wide angle 210 mm lens or a 600 mm long focal length lens.

The tripod 101 allows weight support of the photographic system 100 and ultimate transfer of the weight to the floor or ground. The tripod 101 may be configured with feet 102 that limit slip of the photographic system 100. The tripod 101 may also have individual legs that are adjustable such that the photographic system 100 may be placed on uneven terrain. The tripod 101 may have horizontal adjustments 103 which allow for relative displacement of the photographic system 100 in horizontal planes, thereby allowing fine composing of images along the lens image axis 605. The tripod 101 may also have a vertical adjustment 104 whereby the camera body 500, lens 105, magazine 800, two supports 200 and 201 and the connection plate 300 can be elevated or angled at the discretion of the user. The tripod 101 may also have an optional level or bubble allowing level placement of the tripod 101.

Figure 2A:
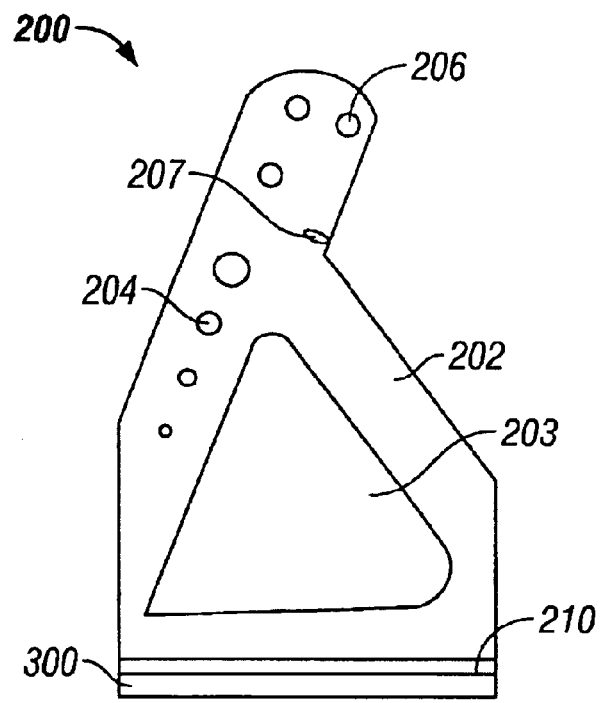
FIG. 2A is a side view of a support arm of the high resolution photographic system of FIG. 1.
Figure 2B:
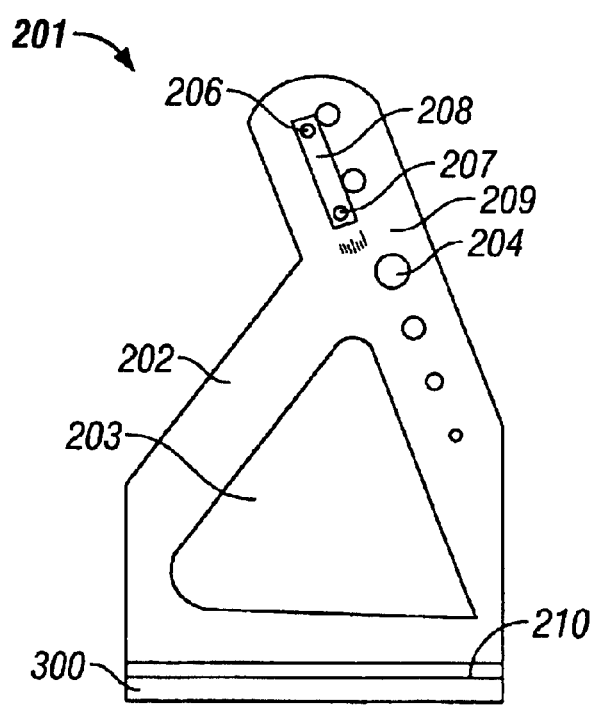
FIG. 2B is a side view of a support arm of the high resolution photographic system of FIG. 1.

Referring to FIGS. 2A and 2B, two supports 200 and 201 are provided to connect the body 500 of the photographic system 100 to a connection plate 300. The supports 200 and 201 allow the camera body 500 to be held such that the camera body 500, and lens 105 are held in a geometry desired by the user. In the example embodiment illustrated, the supports 200 and 201 may be configured from a light weight material to allow the user to transport the photographic system 100 with minimal weight. Examples of the light weight material include aluminum, titanium, titanium alloys, zirconium alloys or other light weight materials. The supports 200 and 201 may be configured with an upright 202 placed at a desired angle to distribute anticipated loads down to the connection plate 300 and eventually the tripod 101.

The supports 200 and 201 may be connected to the connection plate 300 through a weld connection, a screw connection or other arrangement. As illustrated, the supports 200 and 201 have a clear span 203. The clear span 203 may be designed such that the overall weight of the supports 200 and 201 are minimized. Additionally, areas 204 may be cut from the supports 200 and 201 to further lighten overall weight. A connection point 206 may be configured to allow a bolt to connect the support arms 200 and 201 to a point in the camera body which corresponds to the central horizontal axis of the film plane. Another connection point 207 may be configured as a slot to allow a variable, locking connection of the supports 200 and 201 to the camera body 500 with a second bolt. The elongated configuration of the connection 207 allows for differing tilt arrangements of the camera body 500 in relation to the lens 105. The configuration of the connection 207 allows the film plane to be tilted around a center horizontal axis. The slots are configured such that if the connecting bolts are positioned at the extreme end of the slots, with the bolt penetrating the camera body sockets 503 or 502, the film plane will be in a neutral alignment position, with no tilt.

The support 200 may be configured to allow the dark slide to be removed from the magazine 800. In the example embodiment illustrated, the overall length 210 of the supports 200 and 201 are chosen to match an overall length of the connection plate 300. Support arm 201 is configured with a back tilt indicator arm 208 and measurement scale 209 which define the tilt angle achieved when using the back tilt mechanism.

Figure 3:
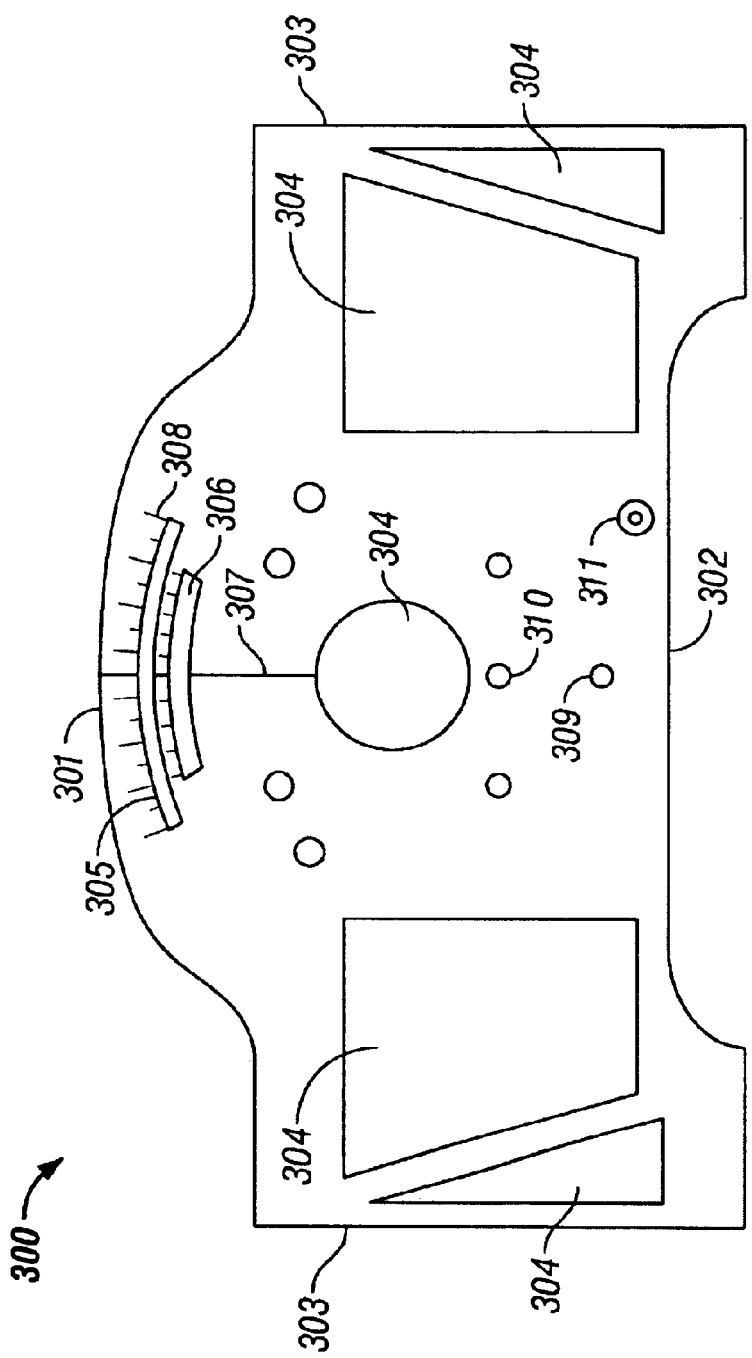
FIG. 3 is a top view of a connection plate which joins the two support arms of the FIGS. 2A and 2B.

Referring to FIG. 3, a connection plate 300 used to support the weight of the entire upper camera system including elements such as the camera body 500, lens and bellows support rod 400, front standard 413, and magazine 800 and/or ground glass 700. The connection plate 300 allows for tuning positions of the photographic system 100, including back swing, to establish a desired image. The connection plate 300 has a front 301, a back 302 and two sides 303. The illustrated configuration is but one possible embodiment and should not be considered limiting.

The connection plate 300 may be configured with a first sliding slot 305 for long to short focal length (for example 600 mm–300 mm), and a second sliding slot 306 for very short focal length (for example 210 mm). Both slots are configured such that they describe part of a circle whose center point is at the horizontal center of the film plane which is at hole 309 in the connection plate 300. The first sliding slot 305 and the second sliding slot 306 are configured to accept a pin 407, thereby allowing precise centering of the front standard relative to the central vertical axis of the film plane at the neutral alignment track 307 when desired. The first sliding slot 305 and the second sliding slot 306 are manufactured to tolerances such that precise positioning of the film and lens plane may occur. The hole 309 allows a center vertical axis back clamp 403*b* for the support rod 400 to be attached with a spring loaded bolt. This will enable the support rod 400 to be moved along sliding slots 305 and 306 while one end is fixed at the horizontal center of the film plane which enables the system to have center vertical axis back swing.

This center vertical axis swing capability at the film plane allows for superior image management and employment of the Scheimflug Effect. It is particularly important with this extremely large format camera because it is the only way that swing can be used with commercially available, non-custom lenses without vignetting of the image. Image vignetting would occur if only front swing was available because the image circle of commercial lenses is only rarely large enough to cover the 9 inch×18 inch negative format. Such lenses will not allow for significant lens movement without vignetting. Vignetting would lessen the useable area of the film, thereby limiting the high resolution capability of the camera.

The center vertical axis back clamp 403B may have a slip connection for attachment to the support rod 400. This will enable the support rod 400 to be turned along its main axis.

The connection plate 300 may have a tripod threading 310 to allow the tripod 101 to be attached to the connection plate 300. The placement of the threading 310 may be altered to provide differing locations of the center of gravity of the system 100. Connection plate cutouts 304 may be created in the connection plate 300, thereby decreasing total weight of the connection plate 300. A bubble 311 may be placed on or in the connection plate 300, thereby allowing the user to ascertain the overall levelness of the connection plate 300. Although illustrated as a round leveling bubble, other configurations are possible, including electronic levels. The connection plate 300 and the camera support arms 200 and 201 may be made of a high strength metallic material, such as aluminum, titanium, magnesium and alloys of these metals, as examples. The connection plate 300 thickness should be sufficient to support the weight of the camera body 500 and magazine 800 without deflection. The connection plate 300 may have two guides underneath to allow for quick assembly of the tripod 101 to other components of the photographic system 100 wherein the components are guided to the correct installation configuration. The top surface of the connection plate 300 may have scale markings 308 such that a user may identify a horizontal angular position of the lens plane to the film plane.

Figure 4:
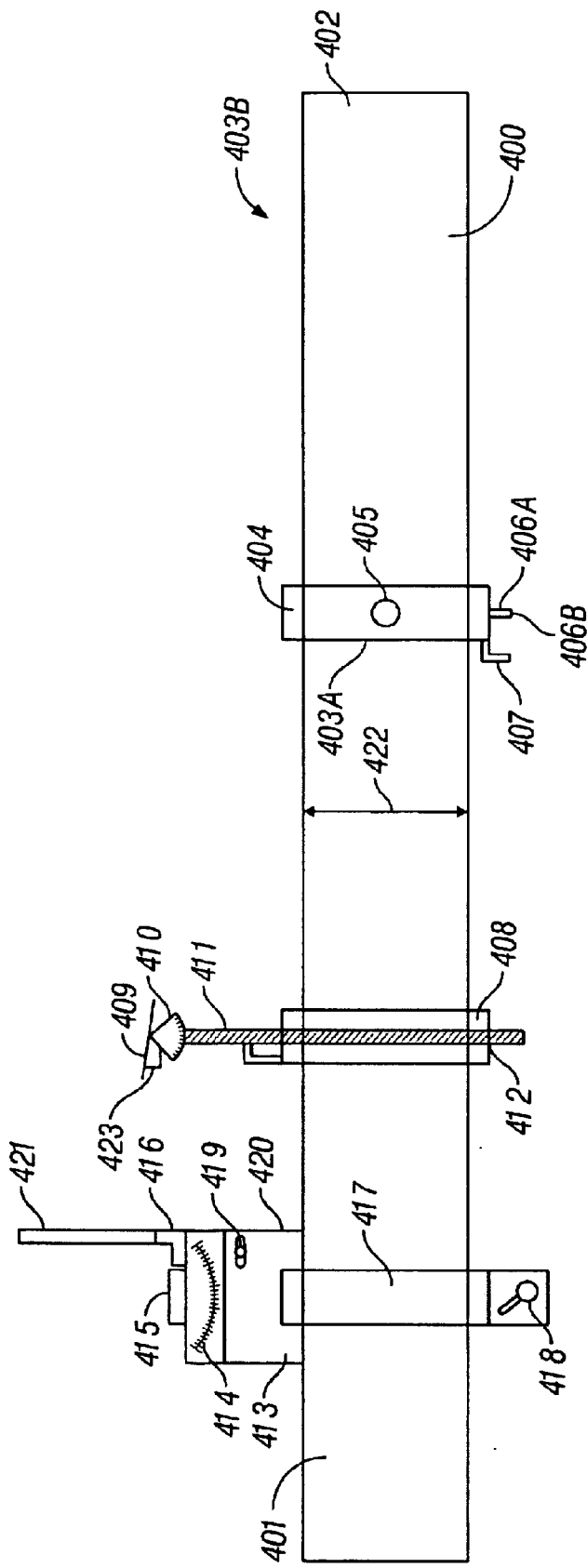
FIG. 4 is a side view of a lens and bellows support rod, with additional components installed, of the high resolution photographic system of FIG. 1.

Referring to FIG. 4, a lens and bellows support rod 400 is illustrated which provides a plurality of functions. Certain components on and of the lens and bellows support rod 400 may be obtained from Sinar Bron Inc. p2 view camera components, for example. The lens and bellows support rod 400 has a front end 401 and a back end 402. The support rod 400 may be made of material such as lightweight aluminum, carbon fiber or other high strength material to support loads placed upon it. The back end 402 can be attached to the connection plate 300 with the center vertical axis back clamp 403B, and a point toward the front end 401 can be attached to the sliding front clamp 403A such that the support rod 400 is in a cantilever configuration. The sliding front clamp may have a slip connection for attachment to the support rod 400. This will enable the support rod 400 to be turned along a main axis. The support rod 400 has a width 422 to allow connection of various apparatus though slip connections.

A sliding front clamp 403A is attached through a slip connection 404 to the support rod 400. The slip connection 404 allows a user to rotate the support rod 400 or the front standard 413. The grip 405 has a surface which limits slip for the user. The sliding front clamp 403A also has an attachment bolt 406A which is configured for insertion into the connection plate 300. The attachment bolt has a diameter which is specifically dimensioned to snugly fit into the first sliding slot 305. For attachment to the second sliding slot 306, there is a separate attachment bolt 406B also specifically dimensioned. The pin 407 located on the sliding front clamp can be set into the neutral alignment track 307 on the connection plate 300 to facilitate parallel horizontal alignment of the lens plane to the film plane.

A bellows support 408 can be positioned on the support rod 400. The bellows support 408 is a vertical support for the regular bellows 600A to limit deflection of the standard bellows 600A over an outstretched length. The bellows support 408 may have a bellows support plate 409, a calibrated horizontal swivel 423, support rods 411 and a grip connection 412. The plate 409 may be angled by the calibrated vertical hinge 410 such that the plate 409 can contact the bellows 600a at a desired angle. The calibrated vertical hinge 410, in the exemplary embodiment illustrated, may provide an adjusting capability of up to approximately forty degrees. The rods 411 allow for vertical adjustment of the bellows support 408. The rods 411 may be threaded rods, tubes, channels or other appropriate configuration.

A front standard 413 allows weight transfer of the lens 105 to the support rod 400.

The front standard 413 allows for the lens to move vertically and horizontally from the lens/image central axis, forward and back between the lens plane and the film plane, as well as tilt and swing on central vertical and horizontal axes. The front standard 413 has a bracket 416 adapted to contact an exterior section of the front standard lens plate frame 421 to allow the weight transfer. The entire front standard 413 maybe removed from the support rod 400. The front standard 413 also has two graduated scales 414 and 415 which allow the relative tilt and swing angles of the lens 105 to be measured. The front standard 413 may have a slip connection 417 for attachment of the front standard 413 to the support rod 400. The slip connection 417 may be secured through the use of a lock 418 which increases friction between the slip connection 417 and the support rod 400. The lock 418 can be configured to engage quickly through turning the lock member. A bubble 419 may be positioned on a housing 420 to indicate a level position of the housing 420.

Figure 5:
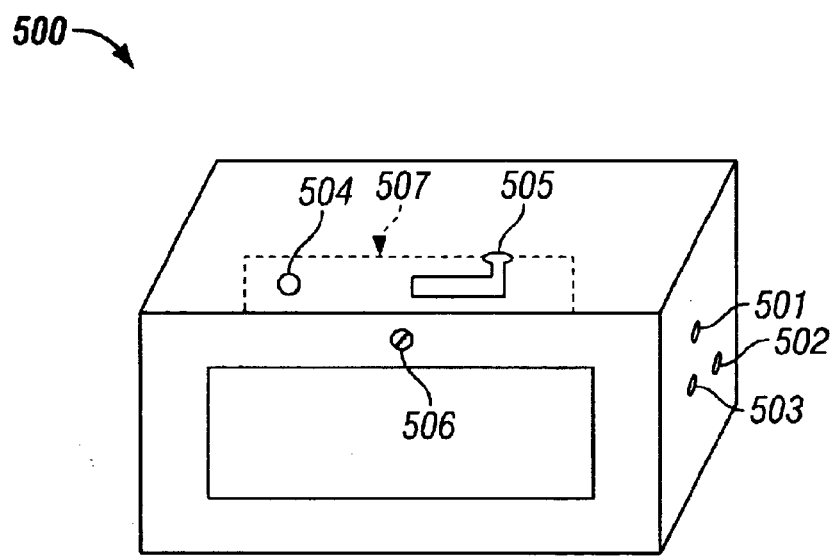
FIG. 5 is a perspective view of the camera body of the high resolution photographic system of FIG. 1.

Referring to FIG. 5, the camera body 500 with an internal calibrated winding mechanism may be a rectangular box shape with a front configured to accept attachment of the bellows 600A and 600B. The rear of the rectangular box shape is configured to accept the ground glass 700 and the magazine 800.

The camera body 500 attaches with wing bolts penetrating into two of the three female sockets 501, 503, or 502, the last two of which align with opening 207 in arm supports 200 and 201. Socket 501 is always employed with either socket 503 or socket 502, depending on the user determined need for forward or backward tilt of the film plane. Socket 501 is positioned at the vertical center of the film plane which enables the system to have center horizontal axis back tilt. Socket 501 aligns with connection 206 on the arm supports.

This center horizontal axis tilt capability at the film plane is very important for image management and employment of the Scheimflug Effect. It is particularly important with this extremely large format camera because it is the only way that tilt can be used with commercially available, non-custom lenses without vignetting of the image. Image vignetting would occur if only front tilt was available because the image circle of commercial lenses is only rarely large enough to cover the 9 inch×18 inch negative format. Such lenses will not allow for significant lens movement without vignetting. Vignetting would lessen the useable area of the film, thereby limiting the high resolution capability of the camera.

The camera body 500 has a film advance capacity. A film advance mechanism 507 provides an actuator button 504, a film advance handle 505, and a film advance interface 506 to transfer the advance movement to the film advance interface 807 on the magazine 800.

The camera body 500 may be configured to have an overall depth of approximately 3.75 inches in order to allow for full use of wide angle lenses. The rectangular box shape may be made from aluminum, for weight savings. Other metallic materials may also be used, including, but not limited to titanium, titanium alloys, magnesium alloys, zirconium alloys and stainless steel. The camera body 500 may be adapted, for example, from aerial camera bodies provided by Fairchild Inc.

Figure 6A:
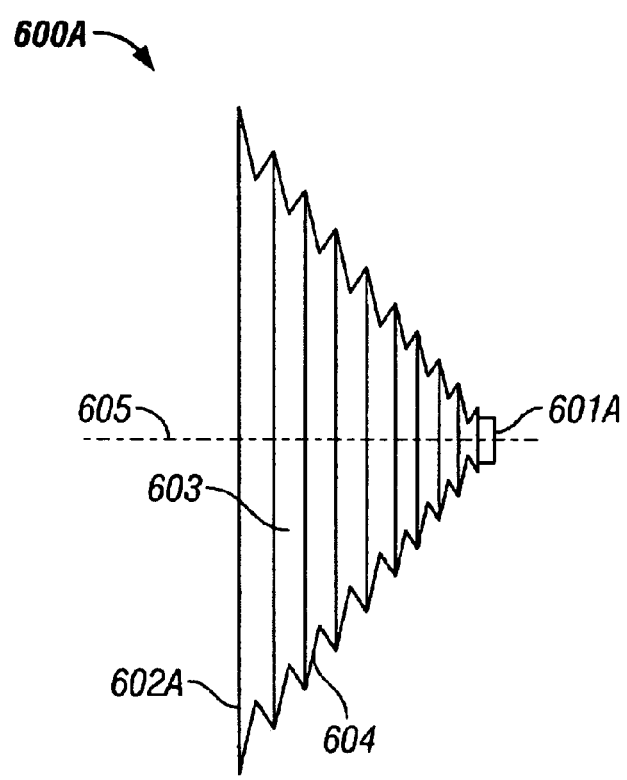
FIG. 6A is a side view of a standard bellows of the high resolution photographic system of FIG. 1.
Figure 6B:
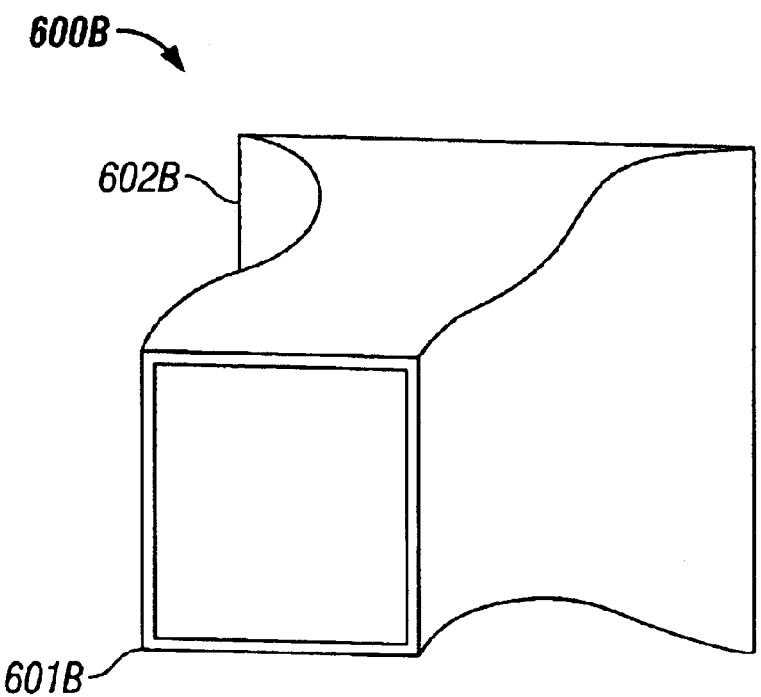
FIG. 6B is a perspective view of a wide angle bellows of the high resolution photographic system of FIG. 1.

Referring to FIGS. 6A and 6B, standard bellows 600a and wide angle bag bellows 600b provide connections between the lens plate frame 421 and the camera body 500. The bellows 600a and 600b exclude light from entering the volume 603 defined by the exterior of the bellows 600A and 600B. The standard bellows 600A may be configured with multiple expandable pleats 604 allowing the bellows 600A to stretch over differing distances. The wide angle bag bellows 600B may be configured as a loose non-pleated bag unit to allow near distance flexibility for wide angle lenses. The bellows 600A and 600B may be made of fabric or other light proof, flexible materials. The bellows 600A and 600B may be configured to retract such that the bellows 600A and 600B can be stored in an essentially flat configuration for easy transportation.

The bellows 600A and 600B are configured with a lens end 601A and 601B and a body end 602A and 602B. The lens end 601A and 601B may be configured from rugged material, such as a metal or plastic, to allow attachment to the lens plate frame 421. The lens end 601A and 601B may be configured to interface with a quick disconnect feature on the lens plate frame 421 to allow quick interchange between standard and wide angle bellows 600A and 600B. The bellows may be attached to the lens plate frame 421 with screws or other applicable mechanisms, including a simple lever which locks the four sides of the lens end of the bellows in a light tight grip.

The body ends 602A and 602B may also be configured of a rugged material, such as a metal or plastic, to allow attachment of the bellows 600A and 600B to the camera body 500 in a body-bellows connection similar to the lens plate frame-bellows connection. The wide angle bag bellows 600B may be attached on the body end 602B through the use of a plate which connects the body end 602B of the bellows 600B to the camera body 500.

Figure 7A:
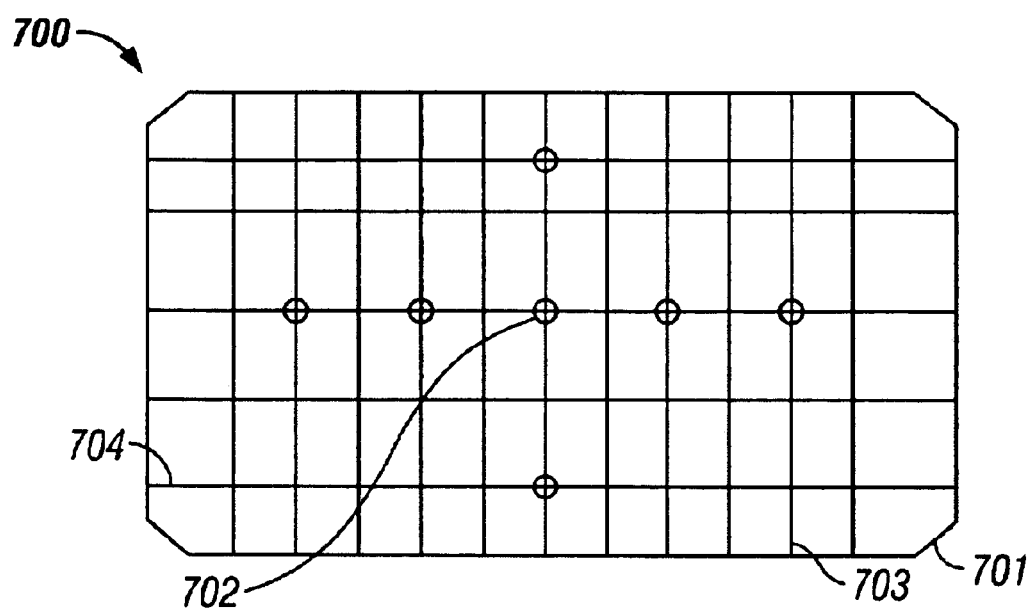
FIG. 7A is a back view of a ground glass of the high resolution photographic system of FIG. 1.
Figure 7B:
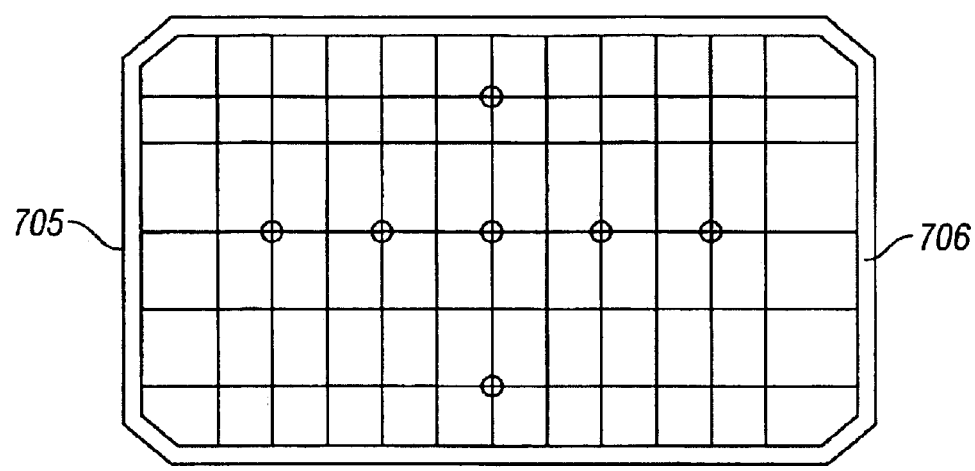
FIG. 7B is a perspective view of a ground glass of the high resolution photographic system of FIG. 1.

Referring to FIGS. 7A and 7B, a ground glass 700 allows the image to be seen by the photographer before a picture is taken. The ground glass side of the glass faces the lens and is positioned at the film plane to tolerances of $2/1000$ths of an inch.

The ground glass 700 may have a rectangular shape consistent with the size and shape of the negative, with corners 701 removed to allow for the air to enter or escape from the bellows cavity when it is extended or collapsed, as well as to enable viewing of the lens opening to observe if there are any vignetting problems due to f/stop and camera configuration. The ground glass 700 has a grid of vertical 703 and horizontal 704 lines, created by an absence of etching, to aid in composition. The glass 700 has seven clear circular areas 702 which may be ½ inch in diameter, devoid of etching but for a small crosshair centered in each area to aid in focusing. These circles allow the photographer to view the image projected by the lens without the interference of the etching, which by its very nature softens the clarity of the image before it can reach the eye. With the aid of a pocket microscope (10x–25x), the photographer can accurately focus the image with much greater accuracy than on a conventional ground glass surface, which cannot be viewed with magnification greater than 4x–10x. This special ground glass allows the system to capture extremely sharp images. The axial positioning of the circular areas 702 allow for the focusing across representative areas of the image.

The ground glass 700 is positioned tightly in a lightweight metal frame 705 which is configured to connect to the back of the camera body 500 in a manner identical to the bellows-camera body interface, with a simple lever attachment on the camera body 500. The frame has a hook and loop tape face 706 on an outer edge to enable a dark cloth with compatible hook and loop tape edging to be attached to the camera for both viewing and focusing the image on the ground glass by the user.

Figure 8A:
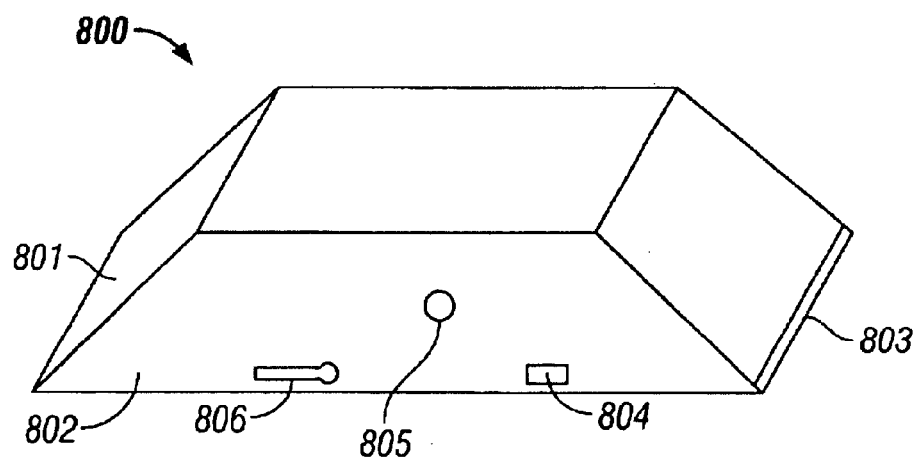
FIG. 8A is a side perspective view of a magazine of the high resolution photographic system of FIG. 1.
Figure 8B:
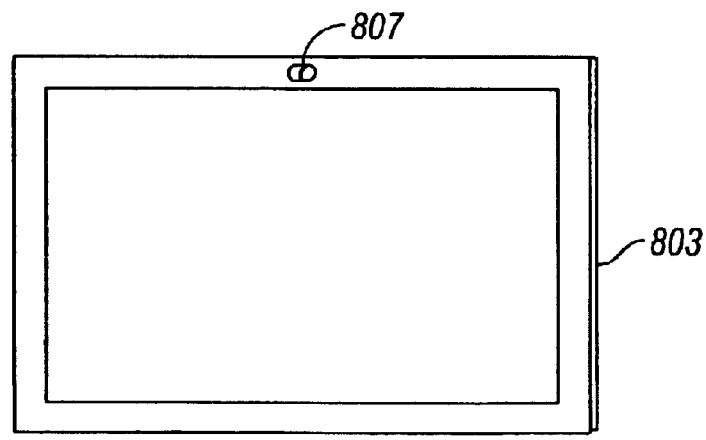
FIG. 8B is a front view of a magazine of the high resolution photographic system of FIG. 1.

Referring to FIGS. 8A and 8B, a magazine 800 provides for storage, winding, and positioning of 100 foot or 200 foot rolls of film for the camera system 100. The magazine 800 may be configured to store, wind and position film to make 9 inch×18 inch format negatives in black and white, as well as color. The standard film width for the system is 9.5 inches.

The magazine 800 may be configured with a counter 804 to allow a user to numerically track progression of the film. The counter 804 may be a progressive wheel configuration or a digital counter. The counter 804 may be internally lighted to allow reading of the counter in low light conditions. The magazine may also have a mechanical film advance indicator 805 to ensure fool proof information regarding film movement to the user.

A vacuum connection 806 allows for establishment of a vacuum within the magazine 800 to pull the individual frames of the film against a flat surface during exposure, thereby decreasing film distortion and increasing picture quality. A vacuum may be established through a vacuum pump 1000 connected to the magazine vacuum connection 806.

The magazine 800 may have a back cover 802 which may be quickly disconnected from the magazine body 801 to allow film change by the user in a dark room. The magazine 800 may be made of stainless steel, aluminum, magnesium or other material to allow for rugged use. The inside of the magazine 800 may be painted or otherwise coated with flat black to minimize stray light reflection. The outside of magazine 800 may also be painted or otherwise coated on the exterior surface, thereby minimizing corrosion and enhancing overall visual appearance.

The magazine 800 may also be manually operated when loading film by turning the film advance interface 807 such that each individual frame is advanced. The magazine 800 has a dark slide 803 to protect the film from exposure when the magazine is separated from the rest of the system.

Figure 9:
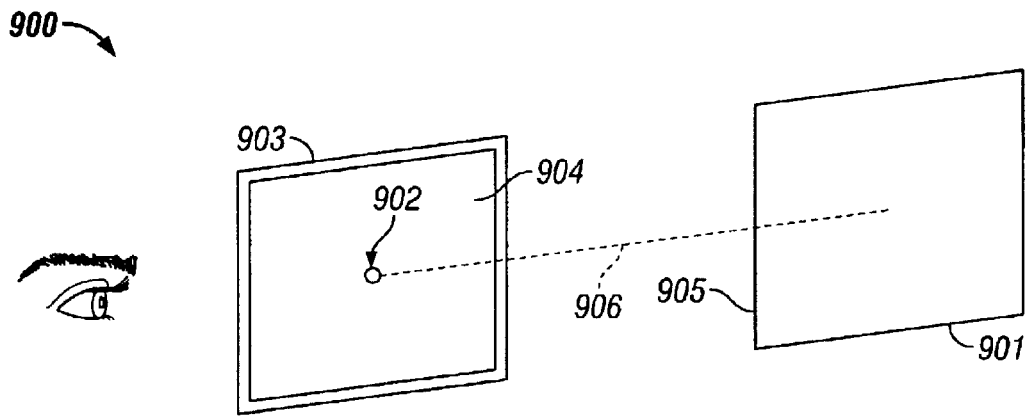
FIG. 9 is a view of the mirror alignment device.

Referring to FIG. 9, a mirror alignment device employs a lens plane mirror 900 with a center hole 902, through which the user views a second mirror 901, which is placed by hand on the ground glass 700. Mirror 901 faces back toward the lens plane mirror 900. The front mirror 900 is held in place by a frame 903 which attaches to the lens plate frame 421 in a manner identical to that of the bellows. While looking through the center hole 902 toward mirror 901, a user may align the lens plane and the film plane to near perfection by using the tilt and swing capabilities of the camera and watching for an infinity repeating pattern 906 of the image which is reflected between the front mirror surface 904 and the back mirror surface 905.

Figure 10:
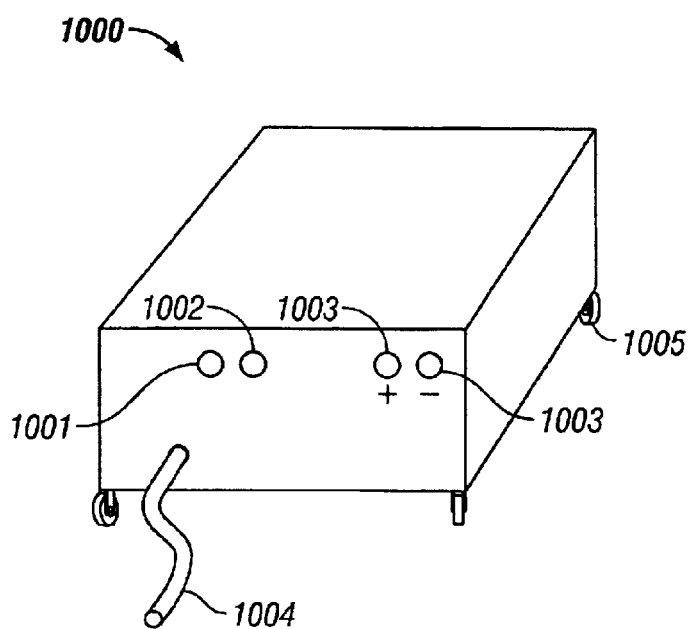
FIG. 10 is a view of the vacuum device.

Referring to FIG. 10, a hardened plastic, weather resistant box 1000, approximately 6 inch×6 inch×6 inch square, houses a small battery operated vacuum pump, for example a Thomas Pump GO45-12 volt unit, which is dampened with shock absorbing feet 1005 to minimize vibration. A rechargeable battery may also be placed inside the box 1000. The box 1000 has a vacuum hose 1004 which is connected inside to the vacuum motor, an on/off button 1001, an on/off indicator light 1002, and battery charge connection bolts 1003. The device is designed to create sufficient vacuum to pull the film inside the magazine 800 flat during exposure.

The process for obtaining an image with the high resolution photographic system will be explained. The magazine 800 is loaded with color or black and white film in a 9.5 inch×100 foot roll. Next, the body 500 is attached to the support arms 200 and 201 which form a single unit with the connection plate 300. The connection plate 300 is attached to the tripod 101. The support rod 400 is then attached to the connection plate 300 with the sliding front clamp 403A and the center vertical axis back clamp 403B. The bellows support 408 and front standard 413 are connected. The ground glass casing 700 is then inserted into the back of the camera body 500. The mirror alignment system 500 is used to create precise alignment between the lens plane and the film plane. The bellows 600A or 600B is attached at the back end to the camera body 500 and at the front end to the front standard 413. A lens 105 is then attached to the front standard 413. The system 100 is aligned such that the desired image is evident on the ground glass, and is focused with the aid of the aerial image circles 702. The ground glass is replaced by the magazine 800 at the back of the camera body 500. The shutter is cocked in the lens and the f/stop is set. The dark slide is removed, the vacuum is turned on, and the shutter release exposes the film. The film is then advanced for the next shot.

The exposed negatives may be processed and then used to produce high quality photographs. With the use of a digital scan of the negative, a computer, a software program, and either an ink jet printer or laser/photographic printer, photographs may be made from a small conventional size such as 4 inch×6 inch, to sizes of 6 feet×12 feet and larger. The digital scans may be stored on a computer hard drive, CD, or DVD, and then manipulated by the user with the aid of software programs to generate a refined image. In one example embodiment where a large format 9 inch×18 inch color negative is used to produce an extremely detailed 6 feet×12 feet photograph, a digital scan of the negative can contain 1.2 gigabits of information.

In relation to a central goal of photography, namely the visual capture of large portions of the real world with accurate detail, the system 100 combines, for the first time and in a unique manner, elements of previous cameras as well as new camera devices.

The high resolution photographic system 100 provides a negative that is 9 inches×18 inches, 700 times the area of a standard 35 mm negative, and 2 times the area of the biggest standard large format 8×10 inch negative. This results in much greater capacity for resolution and detail. The high resolution photographic system 100 of the present invention provides movements of advanced large format view cameras including focus, swing, tilt, shift, rise, and fall with the front standard and swing and tilt with the back standard. This results in significant image control (such as control of perspective), and focusing capabilities (such as the opportunity to use of the Scheimpflug Effect to dramatically increase or otherwise alter depth of field). This image control is significantly greater than that of standard 35 mm and medium format cameras, as well as all aerial cameras, which have no image control or movements at all. The high resolution photographic system provides a winding film transport for lengths of roll film, unlike standard 4 inch×5 inch and 8 inch×10 inch large format cameras which use cumbersome sheet film. This results in the ability to take sequences of pictures easily and quickly. The high resolution photographic system provides a vacuum mechanism which enables film flatness to be achieved to within approximately 1/1000th of an inch, a crucial requirement for large negatives which tend to buckle and warp. This results in increased detail and resolution. The high resolution photographic system 100 provides for the use of interchangeable lenses, which is a significant benefit in regard to the composition of images and allows for maximum flexibility in regard to camera placement relative to the subject. The high resolution photographic system 100 provides a ground glass 700 which enables careful composition of the image, as well as the ability to focus on the aerial image with a microscope. This results in a dramatically increased opportunity to create not only well composed images, but extremely sharp images, an opportunity which is impossible with all standard cameras. The system 100 may be configured to be placed on a tripod with the ease, precision, and stability, unlike aerial cameras which are designed to be mounted in airplanes. The high resolution photographic system 100 is furthermore designed and built to allow for easy disassembly into component parts which can easily be packed, transported, and reassembled. The system 100 also provides an alignment device 900 which uses two mirrors to obtain alignment between the lens plane and the film plane. This further ensures fine focus and detail resolution across the entire image.

The ability of the system 100 to move along most traditional view camera axes and make most necessary movements to control focus and image is not found in other roll film, extremely large format cameras with high precision characteristics. The high resolution photographic system 100 provides for focusing capabilities, while producing 9 inch by 18 inch negatives, while also having interchangable lenses, a vacuum back and the capability for extremely high precision. The system 100 also has ease of film transport and controls for focus, swing, tilt, shift, rise and fall at the lens plane and tilt and swing at the film plane.

In the foregoing specification, the invention has been described with reference to specific exemplary embodiments, thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A high resolution photographic system comprising:
    a lens;
    a camera body with film advance mechanism;
    a bellows connecting the lens to the camera body;
    a magazine configured to store and advance a roll of film, wherein the magazine allows a pneumatic suction of a 9 inch×18 inch frame of the film to a platten at a back of the magazine;
    two supports configured to connect to the camera body at a central horizontal axis of the frame of the film allowing the camera body to tilt a user defined amount, the supports configured to have a clear span;
    a connection plate configured to connect each of the two supports, wherein the connection plate provides a swivel attachment for horizontal rotation of the camera body relative to the lens around a center vertical axis of a film plane;
    a support rod attached to the connection plate, wherein the support rod has a bellows support and a front standard;
    a mirror alignment device to aid lens and film plane alignment;
    a ground glass with at least two clear non-intersecting circular areas; and
    a vacuum pump configured to provide the pneumatic suction.

2. The high resolution photographic system according to claim 1, wherein the front standard has two graduated scales.

3. The high resolution photographic system according to claim 1, wherein the connection plate and the two supports are made of aluminum.

4. The high resolution photographic system according to claim 1, wherein the magazine is configured to provide a housing for the film which is at least 100 feet long.

5. The high resolution photographic system according to claim 1, wherein the camera body and magazine are configured to produce 9 inch×18 inch negatives.

6. The high resolution photographic system according to claim 1, wherein the lens is configured to be detachable.

7. The high resolution photographic system according to claim 1, wherein the magazine has a vacuum connection.

8. The high resolution photographic system according to claim 1, wherein the camera body is made of aluminum.

9. The high resolution photographic system according to claim 1, wherein the magazine has a counter configured to count individual exposed film frame movements.

10. The high resolution photographic system according to claim 1, wherein the lens has a focal length between approximately 200 millimeters to 600 millimeters.

11. The high resolution photographic system according to claim 1, wherein the camera body has four holes configured to be aligned with slots on the two supports to allow a changeable, fixed relative tilt movement of the camera body to the lens.

12. The high resolution photographic system according to claim 1, further comprising:
    a sliding front clamp with a pin to calibrate neutral horizontal alignment between the lens and the film plane by insertion in a defined track on the connection plate.

13. The high resolution photographic system according to claim 1, further comprising:
    a sliding front clamp with two interchangeable bolts configured to be inserted into the first and second sliding slots of the connection plate.

14. The high resolution photographic system according to claim 1, wherein connection plate is configured to support a weight of the camera body, bellows, two supports and lens without deflection.

15. The high resolution photographic system according to claim 1, wherein at least one of the two supports is configured with a back tilt measurement scale.

16. The high resolution photographic system according to claim 1, wherein the connection plate is configured with scale markings to identify a horizontal angular position of the lens plane to the film plane.

17. A method of obtaining a high resolution photographic image with a camera comprising:
    loading a magazine with a roll of film;
    inserting a ground glass into a back of a camera body;
    employing clear circular areas of the ground glass and a microscope to focus an image;

aligning a film plane to a lens plane through a mirror alignment system;

attaching a lens to the camera;

using a mirror alignment device to aid in lens and film plane alignment; and exposing a film frame of the roll of film.

18. The method of obtaining a high resolution photographic image according to claim 17, further comprising:

advancing the roll of film to a second film frame.

19. The method of obtaining a high resolution photographic image according to claim 17, further comprising:

setting an f-stop value and shutter speed prior to the exposing the film frame.

20. The method of obtaining a high resolution photographic image according to claim 17, further comprising:

using front and back tilt, and front and back swing to compose the image.

21. The method of obtaining a high resolution photographic image according to claim 17, further comprising:

providing a vacuum to the magazine to flatten an unexposed film frame.

* * * * *